Nov. 17, 1942.  A. GRAVES  2,302,210
NAVIGATION OF AIRCRAFT, SHIPS OR THE LIKE
Filed March 26, 1941  5 Sheets-Sheet 1

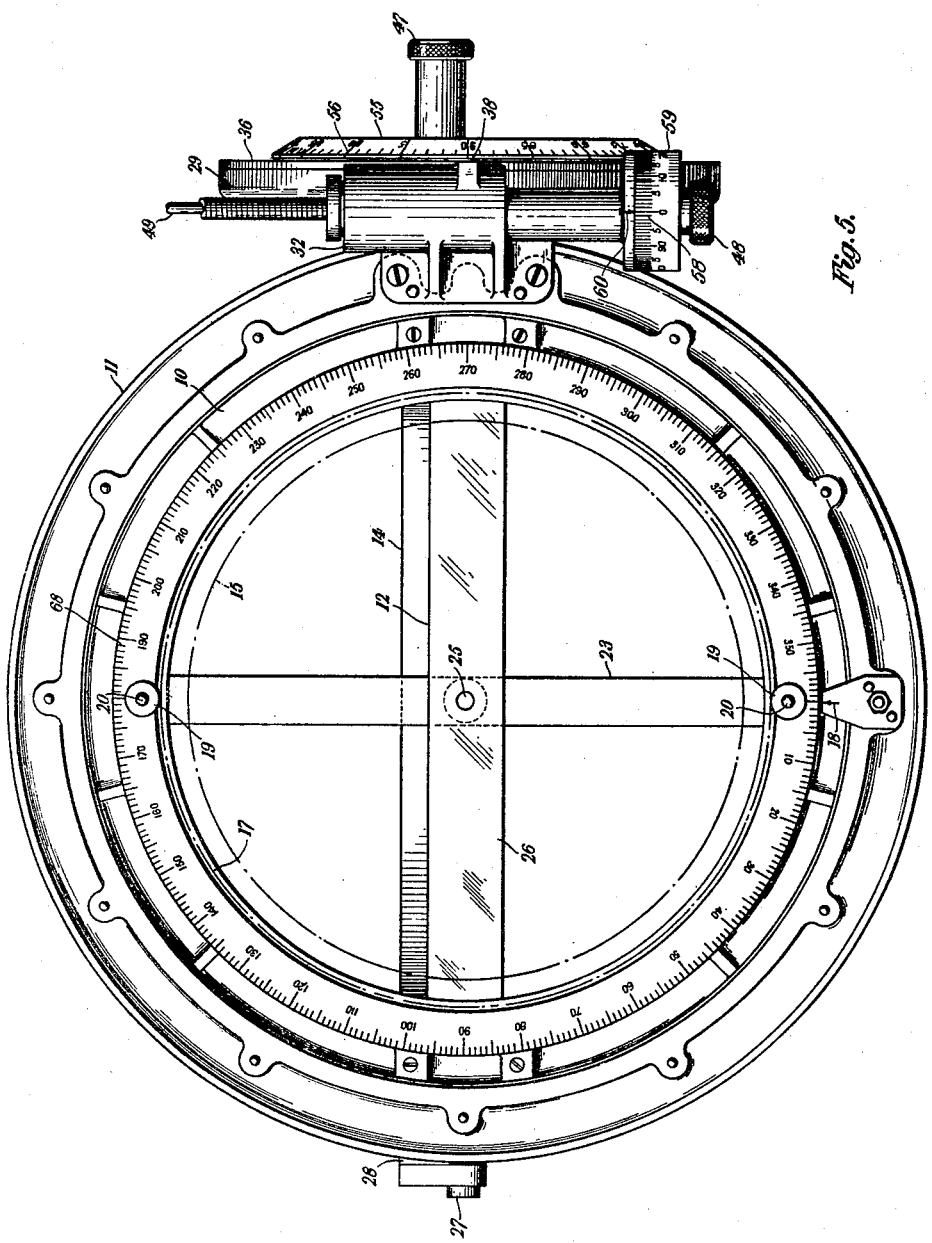

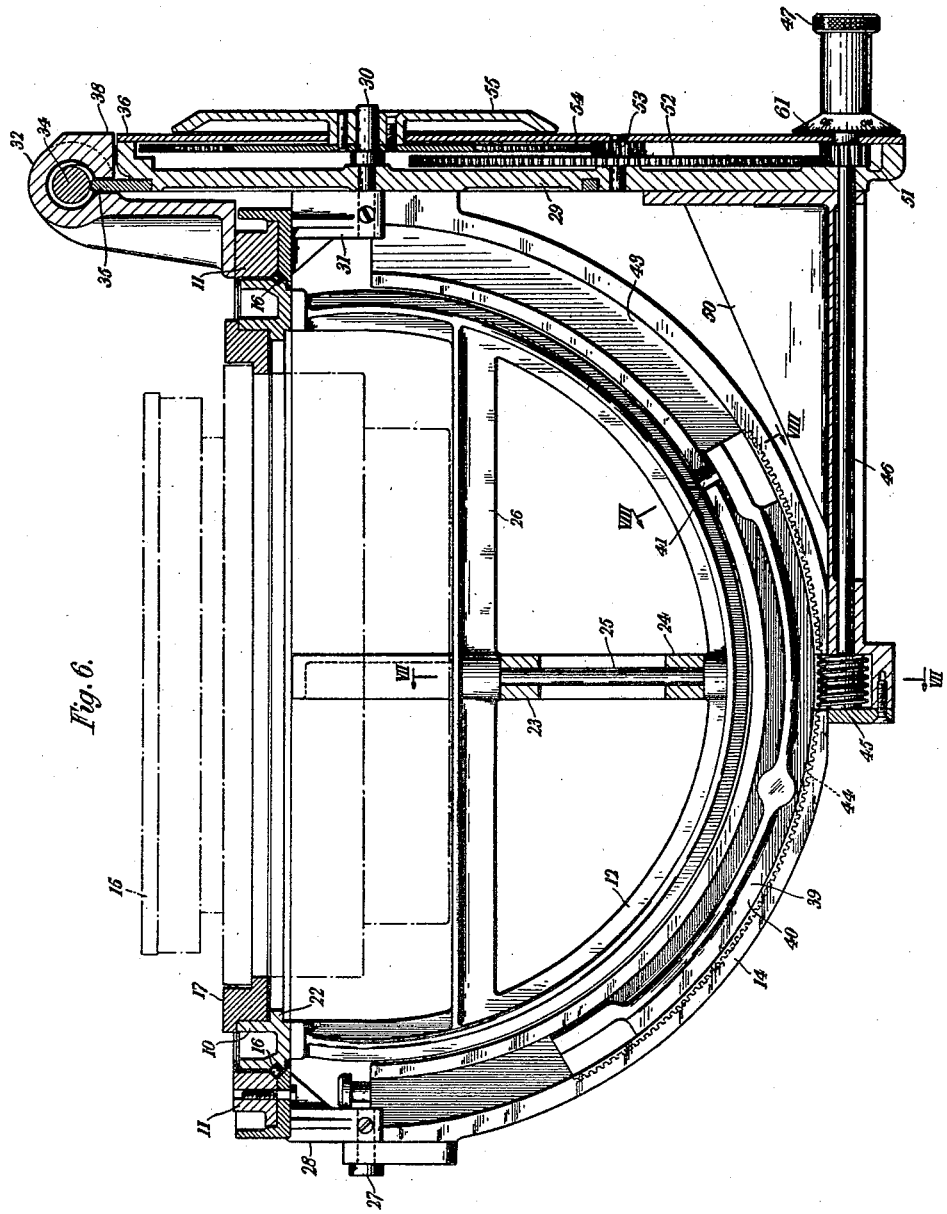

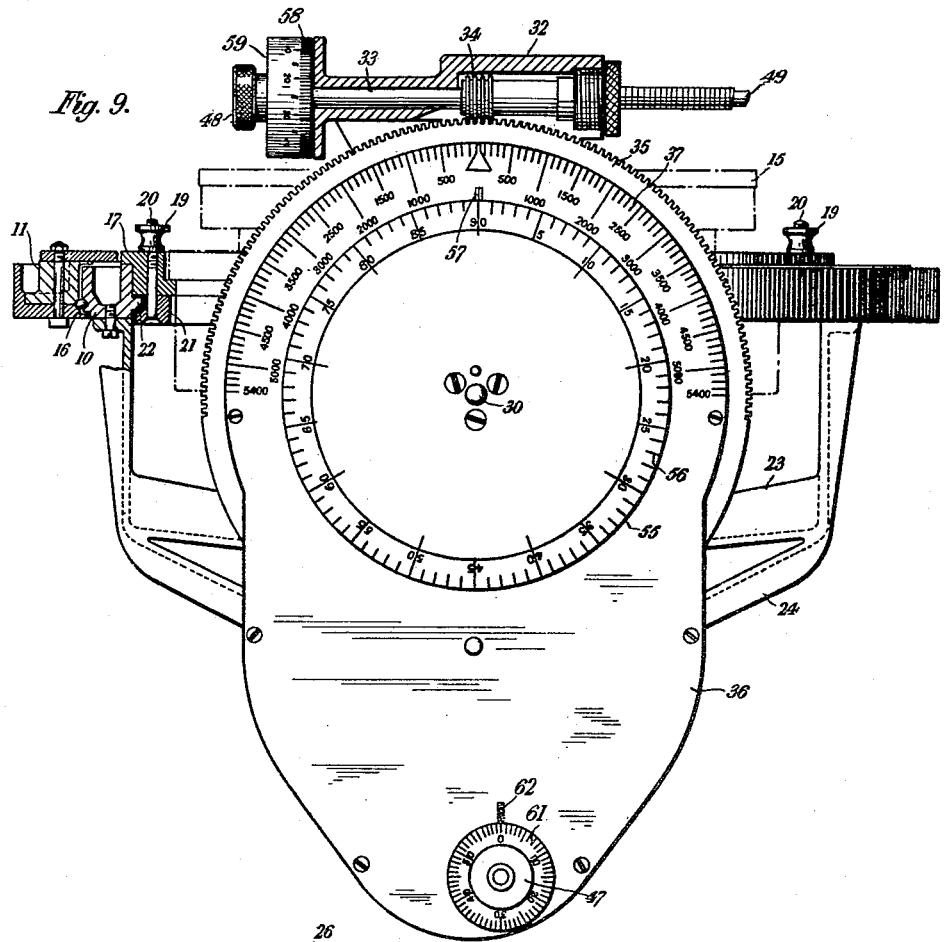

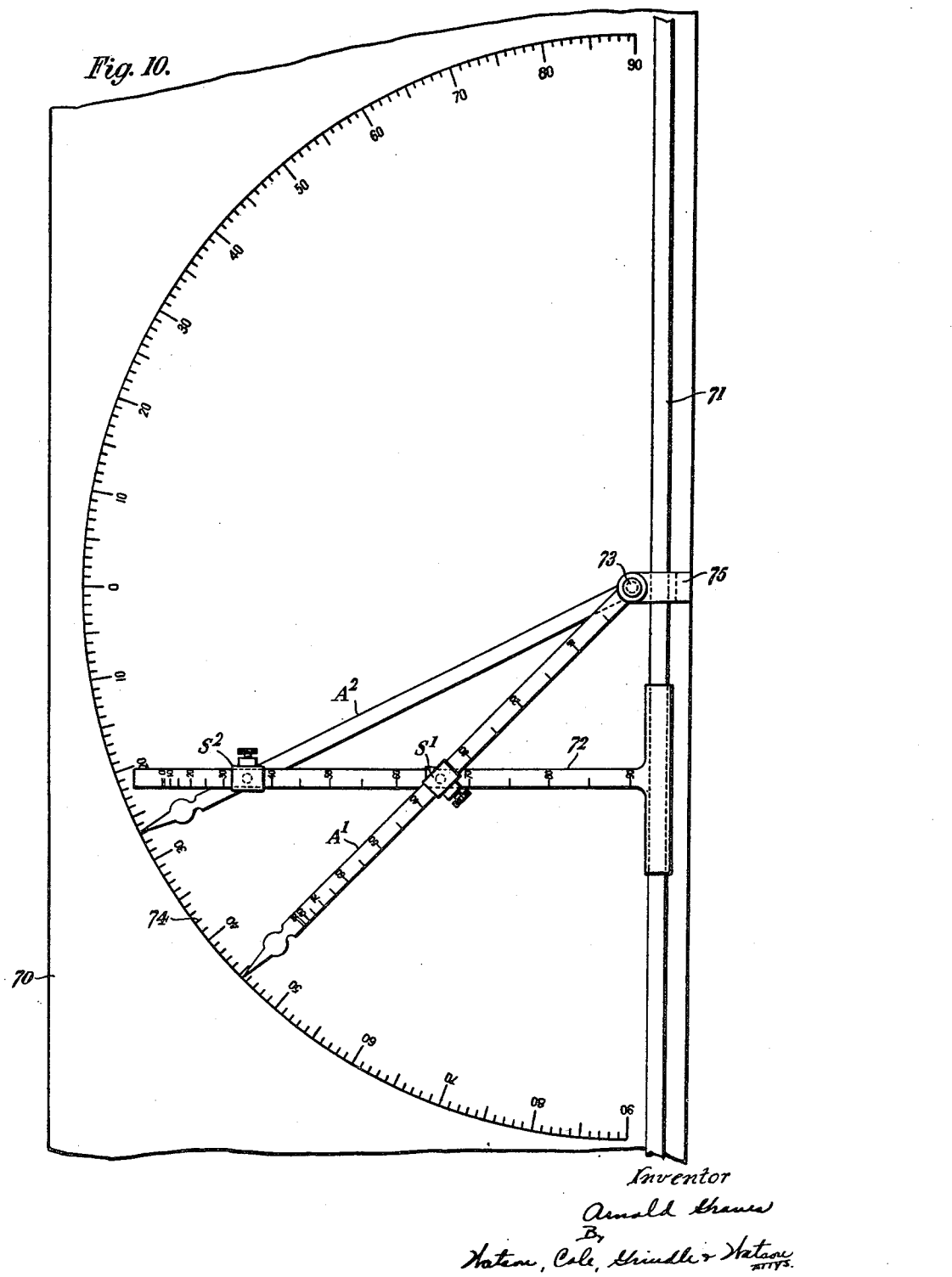

Patented Nov. 17, 1942

2,302,210

UNITED STATES PATENT OFFICE 2,302,210

NAVIGATION OF AIRCRAFT, SHIPS, OR THE LIKE

Arnold Graves, Surbiton, England, assignor of one-half to Alltools Limited, Brentford, Middlesex, England Application March 26, 1941, Serial No. 385,340
In Great Britain March 9, 1940

9 Claims. (Cl. 33—1)

This invention relates to instruments for indicating to the navigator of an aircraft, ship or the like, the compass course which he must follow to travel from one point to another along a great circle.

The theoretical considerations underlying the invention will be explained with reference to the diagrams shown in Figures 1–4 of the accompanying drawings.

Figure 1 is intended to represent the globe, P being the north pole, D the point of departure, T the point of destination and DT the great circle joining these points having its vertex at V. All great circles have two vertices. These are the points on the circle which are furthest from the equator and are the only points at which the great circle crosses a meridian at right angles. The arc of the meridian intercepted between the vertex and the equator measures the latitude of the vertex of the great circle. The vertex V shown in Fig. 1 is the vertex in the northern hemisphere, but the great circle has of course another vertex in the southern hemisphere, at the opposite end of the diameter of the earth which passes through V. Then the angle PVD will be a right angle, and the compass bearing required for great circle sailing will be the angle VDP, which will constantly vary as the great circle is traversed. Thus when the point D' is reached it will be VD'P.

Consider the apparatus, shown in perspective in Figure 2, in plan in Figure 3 and in side elevation in Figure 4, consisting of two rings mounted for relative rotation one 10 within the other 11 in the equatorial plane of a sphere, two semicircular arms 12, 13 defining meridians, fixed one on each ring and intersecting at right angles, and a further semicircular arm 14, representing a movable great circle of the sphere, pivoted to one ring (say the outer ring 11) so that its diameter extends at right angles to the diameter of the arm 13 fixed to that ring. If now the intersection of the pivoted arm 14 and the fixed arm 13 on the same ring is taken to represent V, the pole of the sphere (i. e. the intersection of the two fixed arms 12, 13) to represent D and the intersection of the pivoted arm 14 and the fixed arm 12 on the other ring to represent P, and an adjustable sliding connection is provided between the intersecting arms at the point P, the apparatus will be one capable of giving the required indications of compass course. As the pivoted arm is moved, the angle PVD will remain a right angle, the distance VD will be varied and, owing to the sliding connection at P, relative movement between the rings will occur, and the changes in the angle VDP will represent the required changes in course angle.

To set the apparatus up, the position of the sliding connection defining P must be adjusted along the pivoted arm 14, which may conveniently be marked with a scale of latitude, to the co-latitude of the vertex, i. e. until the angular distance measured along the arm between the points V and P represents the co-latitude, or, which is the equivalent, until the angular distance of the point P from the nearest pivot represents the latitude $\theta$ of the vertex. The movable arm 14 must then be turned about its pivots through an angle such that the distance between the points D and V represents the distance DV along the great circle to be followed, a suitable scale, e. g. a disc fixed to the arm concentrically with the pivot and marked with the necessary indications, being provided to enable this to be done. These quantities, viz. the latitude of the vertex of the great circle and the distance of the point of departure from the vertex, can be calculated from formulae or determined from tables.

If now continued pivotal movement be applied to the arm 14 at a rate corresponding to the speed of travel, the changes in the angle VDP will represent the changes in course to be followed. The changes in the angle VDP will however be represented by the changes in relative position of the two rings. If therefore one ring is held fixed and the other is connected to the lubbers line, or to the compass box, the desired indications of course angle will be given. Moreover, since the fixed arm 13 representing VD takes no part in the initial settings or in the measurements, it can be eliminated.

The invention therefore provides an apparatus for indicating to a navigator the compass bearings appropriate to great circle navigation between two points, comprising a setting device adjustable to represent the latitude of the vertex of the required great circle, a setting device capable of initial adjustment to represent the distance of the starting point from the vertex measured along said great circle and of subsequent adjustment to represent the variations in said distance at successive points on the great circle, and means responsive to the adjustment of said setting devices for indicating at each stage of the journey, the compass bearing necessary for continued travel along the great circle. The apparatus may include means for varying the adjustment of the second setting device automatically in accordance with the speed of travel.

In one form, the navigational instrument according to the invention comprises two relatively rotatable rings mounted one within the other, a semi-circular arm fixed to one ring with its plane at right angles to that of the ring, a semi-circular arm pivoted to the other ring at opposite ends of a diameter thereof, a sliding connection between the two arms which can be adjusted to any desired position in relation to the pivoted arm and, when so adjusted, is free to slide relatively to the other arm, means for effecting controlled adjustment of the pivoted arm about its pivots and means for indicating changes in angular relationship of the two rings.

If then the sliding connection is moved along the pivoted arm to a position representing the latitude of the vertex of the required great circle, and the pivoted arm is rotated about its pivots to a position representing the distance of the point of departure from said vertex, the relative position of the two rings will indicate the initial compass course to be followed in order to travel along the great circle. If, thereafter, the arm is swung about its pivots to an extent corresponding to the speed of travel the changes in compass course necessary to enable the great circle to be followed will be shown by the changes in angular relationship of the rings.

It is preferred to communicate these changes in angular relationship direct to the compass box, leaving the lubbers line free to receive minor adjustments. Instead of applying the indications of the instrument directly to the compass box or lubbers line, it may in some cases be sufficient to give these indications on a scale, leaving the navigator to adjust the compass manually to accord therewith.

One form of apparatus constructed in accordance with the invention will now be described in detail, by way of example, with reference to Figures 5–9 of the accompanying drawings.

Figure 5 is a plan view of the apparatus,

Figure 6 is a vertical section through the apparatus,

Figures 7 and 8 are sections taken respectively on the lines VII—VII and VIII—VIII in Figure 6, and Figure 9 is an end elevation, partly in section, looking from the right hand side of Figure 5.

Figure 10 is a face view or elevation of an embodiment of the invention in the construction of which all of the parts lie substantially in a single plane.

Figure 1:
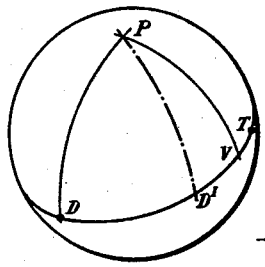

The apparatus comprises a fixed horizontal outer ring 11 mounted (by means not shown) in a definite relationship to the fore and aft line of the ship or aircraft. Within this is a rotatable inner ring 10, supported in the outer ring by ball bearings 16. The compass 15 is supported by an adaptor ring 17, into which it can be fitted in one definite position only. The adaptor ring can turn in the inner ring 10 and is marked with a scale 68 of degrees, from 0° to 360°, which cooperates with an index 18 on the outer ring as shown in Figure 5. Locking devices 19 serve to secure the adaptor ring in any desired position of adjustment in relation to the inner ring. These, as will be seen from Figure 9, are constituted by nuts which cooperate with bolts 20 to draw clamping blocks 21 mounted beneath the adaptor ring 17 into clamping engagement with an inwardly projecting flange 22 on the inner ring 10. The compass is preferably fitted with a verge ring, not shown, to permit of the necessary corrections for variation, deviation and drift. A semi-circular arm 12 is secured to the inner ring 10 by a structure consisting of supporting members 23, 24 and a rod 25, and it is stiffened by a cross bar 26. On the outer ring 11 is mounted a pivoted semi-circular arm 14. At its left hand end the arm 14 turns on a pin 27 fixed in a bracket 28 projecting from the underside of the ring 11. To the right hand end of the arm 14 is fixed a plate 29 mounted for rotation on a spindle 30 disposed parallel to the pin 27 and fixed to a bracket 31 depending from the ring 11.

To the right hand side of the ring 11 is fixed a housing 32 containing a shaft 33 carrying a worm 34. This worm 34 meshes with a semi-circular gear wheel 35 fixed to the plate 29, so that by rotation of the shaft 33 the plate can be swung through 180° about the spindle 30 and consequently the arm 14 rocked about its pivots through 180° relatively to the fixed outer ring 11. Attached to and spaced from the plate 29 is a front plate 36, marked with a circumferential scale 37, calibrated in terms of nautical miles, and cooperating with a fixed index, not shown, on the front face 38 of the housing 32. In the central position of the arm 14 and plates 29 and 36 shown in the drawings this index will be opposite the zero point of the scale 37.

Between the two semi-circular arms 12 and 14 is located an adjustable sliding connection 39. This, as shown in Figures 6, 7 and 8, has an arcuate flange 40 engaging in a correspondingly shaped T-slot 43 in the pivoted arm 14 and carries a pin 41, on which is mounted a roller 67, engaging in an arcuate slot 42 in the arm 12. On its outer periphery the sliding connection 39 is formed with gear teeth 44 meshing with a worm 45 on a shaft 46. When therefore this shaft is turned, by means of a hand knob 47 fixed to it, for the purpose hereinafter described, the sliding connection 39 will be adjusted in relation to the pivoted arm 14 to a position determined by the amount of rotation given to the knob 47. If, after this, the arm 14 is turned about its pivots by rotation of the shaft 33, either by means of a hand knob 48 fixed to this shaft or by means of a flexible drive 49, the sliding connection will remain in the position of adjustment relatively to the arm 14 determined by the setting of the knob 47, but the pin 41 will slide in the slot 42 in the arm 12, thereby causing the inner ring 10 to turn in relation to the outer ring 11.

The shaft 46 is journalled in a bracket 50 fixed to the plate 29 and carries a gear wheel 51, coupled by intermediate gears 52 and 53 to a gear wheel 54 rotatably mounted on the forward end of the spindle 30. To this gear wheel is fixed a disc 55 marked with a circular scale 56 calibrated in degrees of latitude, and cooperating with a fixed index 57 on the plate 36.

The knob 48 is calibrated in terms of distance from the vertex of the great circle along which the journey is to be made, one turn of the knob representing 100 miles. Each graduation on the scale 37 represents 100 miles, but a fine adjustment may be given to the knob by reference to a further scale 58 marked on a drum 59 and cooperating with a fixed index 60. This scale is calibrated in units of miles, so that by turning the knob 48 and observing the scales 37 and 58, the navigator can set the apparatus to the exact distance of his position from the vertex of the great circle.

The knob 47 is calibrated in terms of latitude, and each graduation of the scale 56 represents a single degree. A fine adjustment is obtained by means of a scale 61 on the knob 47 which is calibrated in minutes and cooperates with a fixed index 62, one turn of the knob therefore corresponding to one degree of latitude.

At the start of the journey, the navigator adjusts knob 47 until the latitude of the vertex is set up on the scales 56 and 61. The knob 48 is then turned to the equatorial position, i. e. until the scale 37 reads 5400 east or west according as the desired course is easterly or westerly. With the apparatus in this position, the adaptor ring 17 is set, using the scale 68, relatively to the inner ring 10 to the initial course position at the equator, which is represented by the co-latitude of the vertex. The knob 48 is then turned to set up, on the scales 37 and 58, the calculated distance of the point of departure from the vertex of the great circle. As the journey proceeds knob 48 is adjusted to positions corresponding to successive positions of the aircraft or ship, with the result that the inner ring 10 and compass box 15 will be turned into the position to indicate the correct compass course. The knob 48 is turned continuously during the journey by the flexible drive 49 at a speed corresponding to that of the craft relatively to the earth, or alternatively it may be turned intermittently at intervals by an amount corresponding to the known distance travelled since it was last adjusted. The apparatus therefore enables the correct compass course for great circle sailing to be automatically indicated, requiring only a preliminary determination of the latitude of and the distance of the starting point from the vertex of the great circle, and all that the pilot or helmsman has to do is to keep the compass needle, card or cylinder aligned on the bearing indicated, apart of course from the normal corrections necessary for variation, deviation and drift.

The apparatus according to the invention offers important advantages over known computing appliances which consist of a mechanical representation of the orthodox non-right-angled spherical triangle PTD (see Fig. 1). These advantages are due to the fact that my apparatus is based on a mechanical representation of the right angled spherical triangle PVD, and may be summarized as follows:

(1) The members representing the sides of the triangle are semicircles, and not complete circles (indeed one is omitted entirely), thus enabling the compass to be mounted on top of the apparatus and read accurately and without interference.

(2) There is no likelihood of mechanical interlocks between the members representing the sides of the triangle except in the vicinity of the poles where the compass is useless in any case. With apparatus based on the orthodox triangle, such interlocking is likely to occur anywhere on a course approximating to due north and south.

(3) By selecting the point D as the fixed "pole" of my apparatus and allowing the point (i. e. pin 41) representing P the actual pole to wander over the surface of the hemisphere, I ensure that the compass will remain stationary under all conditions, the adjustments being made to the compass box as the ring 10 turns in the ring 11.

(4) I am able to apply the required adjustments and the drive at fixed points and not at moving ones, as would be required with apparatus based on the orthodox triangle.

As an alternative to the apparatus so far described, in which the point of departure D is represented by the fixed pole of a sphere and the point P, the actual pole, is imagined as wandering over the surface of the sphere, the invention provides an alternative arrangement in which all the movements are represented in the flat. This alternative arrangement is based on the following considerations.

Figure 2:
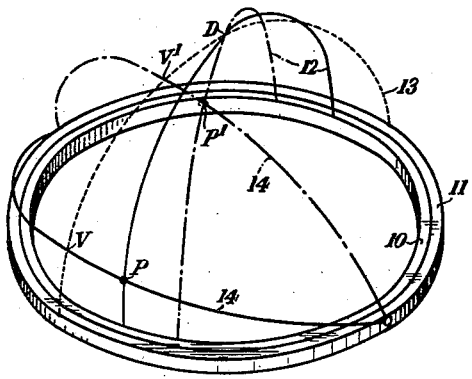
Figure 3:
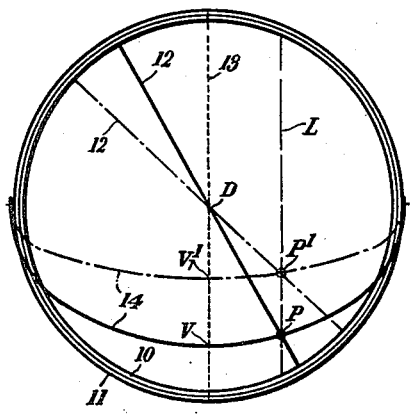
Figure 4:
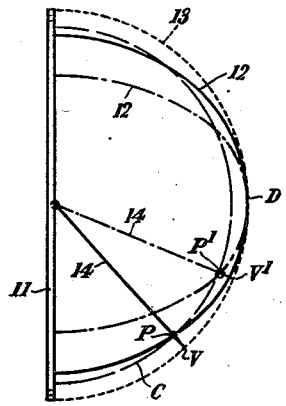

As during the journey the movable semi-circular arm 14 is rotated, remaining always at right angles to the imaginary fixed semi-circular arm 13 (Figures 2-4), the point P will move correspondingly around a small circle on the sphere or radius $R \sin \theta$, where R is the radius of the sphere, and $\theta$ the latitude of the vertex V. This small circle is indicated at C' in Figure 4. The locus of the projection on the equatorial plane of the point P will be a straight line (L in Figure 3) at a distance $R \cos \theta$ from the centre C of the sphere.

The invention therefore also provides a navigational instrument for great circle sailing, comprising a flat base, a slide constrained to slide across the base in a direction at right angles to its length, two pivoted arms which are linked to the slide each by a separate sliding connection, and are movable about pivotal axes at right angles to the base, said axes being either coincident or spaced apart on a line parallel to the length of the slide, and one or more arcuate scales, for indicating the angular position of the arms in relation to the base, having their datum lines parallel to the direction of movement of the slide, one of the sliding connections being capable of being fixed to its associated arm, while still free to slide in relation to the slide, in any position on a scale representing its distance from the pivot of its arm in terms of $\sin \theta$ ($\theta$ being the latitude of the vertex of the great circle) and the other sliding connection being capable of being fixed to the slide, while still free to slide relatively to its associated arm, in any position representing, in terms of $\cos \theta$, its distance from the point on the slide opposite the pivot of its arm.

The first arm (i. e. that carrying the sine scale) may now be considered as representing the radius of the small circle along which the point P travels. The second sliding connection (i. e. that linking the slide to the second arm) will then execute a movement corresponding to the movement of the projection of the point P in the equatorial plane, i. e. along a line at a distance $R \cos \theta$ from the centre of the sphere. If therefore the first arm is placed in the position on its scale (which may be assumed to indicate in terms of degrees of latitude distances along the great circle) corresponding to the distance of the starting point from the vertex, the second arm will indicate on its scale the required initial compass bearing, in degrees east or west of the pole, and if the first arm is thereafter moved to accord with subsequent changes in the position of the craft, the second arm will continue to indicate the required compass bearing.

One particular form of instrument constructed on this principle is shown in plan view in Figure 10 of the drawings. The base consists of a flat board 70 having along one side a straight bar 71 on which is slidably mounted a T-square one limb 72 of which (constituting the slide) is consequently always at right angles to the bar. An arm $A^1$, pivoted at 73 to the upper end of a U-shaped bracket 75 fixed to the board and spanning the bar 71, carries an adjustable sliding connection $S^1$ which can be locked in any desired position of adjustment in relation to the arm $A^1$ and is also in sliding engagement with the projecting limb 72 of the T-square, with the result that as the arm A¹ turns about its pivot the T-square will move across the board. A second arm also movable about a pivot at the bottom of the bracket 75 coaxial with the pivot 73 engages a similar adjustable sliding connection S² which can be locked in any desired position of adjustment on the outstanding limb 72 of the T-square. The board is marked with a circular scale 74 calibrated in terms of degrees and the arm A¹ and outstanding limb 72 of the T-square are marked with graduations calibrated respectively in terms of $\sin \theta$ and $\cos \theta$.

To set the instrument up the two slides S¹, S² are moved to the indications corresponding respectively to $\sin \theta$ and $\cos \theta$, where $\theta$ is the latitude of the vertex of the great circle to be navigated. The arm A¹ is then moved to a position on the circular scale corresponding to the distance of the starting point from the vertex and it is thereafter moved in a manner appropriate to the subsequent positions of the aircraft or vessel. The second arm A² will then, as explained above, indicate on the scale the proper compass course.

In this form the instrument is appropriate for giving an indication to the navigator of the adjustments to be applied to the compass. It will be understood however that it may also be applied direct to the lubbersline or compass and that the movement of the first arm could be effected either intermittently as required by the navigator, or continuously at a speed appropriate to the rate of travel of the craft relatively to the earth.

In the arrangement illustrated, the two arms have coaxial pivots and a single circular scale of degrees. The pivot of the arm A² might however be offset from that of the arm A¹ on a line at right angles to the bar 71 provided the cosine scale on the limb 72 of the T-square commences at a point opposite the pivot of the arm A². In this case the arm A² would have to have a separate circular scale.

What I claim as my invention and desire to secure by Letters Patent is:

1. A navigational instrument, comprising two relatively rotatable rings mounted one within the other, one of said rings being fixed, a semi-circular arm fixed to one ring with its plane at right angles to that of the ring, a semi-circular arm pivoted to the other ring at opposite ends of a diameter of said other ring, a sliding connection between the two arms which can be adjusted to any desired position in relation to the pivoted arm, and when so adjusted, is free to slide relatively to the other arm, means for effecting controlled adjustment of the pivoted arm about its pivots and means for indicating changes in angular relationship of the two rings.

2. A navigational instrument, comprising a fixed outer ring, an inner ring mounted for rotation in the outer ring and adapted to carry a compass box, a semi-circular arm fixed to the inner ring with its plane at right angles to that of the ring, a semi-circular arm pivoted to the other ring at opposite ends of a diameter of said other ring, a sliding connection between the two arms which can be adjusted to any desired position in relation to the pivoted arm, and when so adjusted, is free to slide relatively to the other arm, and means for effecting controlled adjustment of the pivoted arm about its pivots.

3. A navigational instrument, comprising two relatively rotatable rings mounted one within the other, one of said rings being fixed, a semi-circular arm fixed to one ring with its plane at right angles to that of the ring, a semi-circular arm pivoted to the other ring at opposite ends of a diameter of said other ring, a sliding connection between the two arms which can be adjusted to any desired position in relation to the pivoted arm, and when so adjusted, is free to slide relatively to the other arm, a scale calibrated in terms of latitude for indicating the extent of said adjustment, means for effecting controlled adjustment of the pivoted arms about its pivots, a scale calibrated in terms of distance for indicating the extent of said adjustment and means for indicating changes in angular relationship of the two rings.

4. A navigational instrument comprising two relatively rotatable rings mounted one within the other, one of said rings being fixed, a semi-circular arm fixed to one ring with its plane at right angles to that of the ring, a semi-circular arm pivoted to the other ring at opposite ends of a diameter of said other ring, a slide of arcuate form mounted to slide relatively to the pivoted arm, said slide being formed with gear teeth, a gear member meshing with said gear teeth, a control device for rotating the gear member and thereby adjusting the position of the slide relatively to the pivoted arm, a scale calibrated in terms of latitude for indicating the extent of said adjustment, a pin on the slide engaging in a slot in the fixed semi-circular arm, means for adjusting the pivoted arm about its pivots, a scale calibrated in terms of distance for indicating the extent of said adjustment, and means for indicating changes in angular relationship of the two rings.

5. A navigational instrument for great circle sailing, comprising a fixed horizontal support having a circular recess therein, a turntable mounted for rotation in the recess, locating means on the upper surface of the turntable for a compass box to be carried thereby, a semicircular arm fixed to the undersurface of the turntable and located in a plane at right angles to that of the turntable, a semicircular arm at the underside of the support, which is mounted thereon to pivot about an axis parallel to a diameter of the recess, a slide on the pivoted arm, means for setting said slide into any desired position, representing the latitude of the vertex of the required great circle, on the pivoted arm and for holding it there, a sliding connection between the slide and the fixed arm permitting of relative rotation of the arms, and a device for rotating the pivoted arm about its pivots to represent changes in distance from the vertex measured along the great circle.

6. A navigational instrument for great circle sailing, comprising a fixed horizontal support having a circular recess therein, a turntable mounted for rotation in the recess, locating means on the upper surface of the turntable for a compass box to be carried thereby, a semi-circular arm fixed to the undersurface of the turntable and located in a plane at right angles to that of the turntable, a semi-circular arm at the underside of the support, which is mounted thereon to pivot about an axis parallel to a diameter of the recess, a slide on the pivoted arm, means for setting said slide into any desired position, representing the latitude of the vertex of the required great circle, on the pivoted arm and for holding it there, a sliding connection between the slide and the fixed arm permitting of relative rotation of the arms, a device for effecting a preliminary setting of the pivoted arm in relation to the support to represent the distance, measured along the great circle, from the point of departure to the vertex, and means for thereafter automatically moving the pivoted arm about its pivots at a speed corresponding to the speed of travel.

7. A navigational instrument for great circle sailing, comprising a fixed horizontal support having a circular recess therein, a turntable mounted for rotation in the recess, locating means on the upper surface of the turntable for a compass box to be carried thereby, a semi-circular arm fixed to the undersurface of the turntable and located in a plane at right angles to that of the turntable, a semi-circular arm at the underside of the support, which is mounted thereon to pivot about an axis parallel to a diameter of the recess, a slide on the pivoted arm formed with gear teeth, a worm engaging said teeth, a shaft carrying the worm and manually adjustable to set the slide to a position relatively to the pivoted arm representing the latitude of the vertex of the required great circle, a pin on the slide engaging a slot in the fixed arm, a toothed segment secured to the pivoted arm, and disposed in a plane at right angles to its axis of rotation, a worm engaging said toothed segment, a shaft carrying said second-mentioned worm and adjustable to rotate the pivoted arm to represent changes in distance from the vertex measured along the great circle.

8. A navigational instrument for great circle sailing, comprising a fixed horizontal support having a circular recess therein, a turntable mounted for rotation in the recess, a compass mounted on the turntable, a semi-circular arm at the underside of the support, which is mounted thereon to pivot about an axis parallel to a diameter of the recess, a slide on the pivoted arm, means for setting said slide into any desired position, representing the latitude of the vertex of the required great circle, on the pivoted arm and for holding it there, a sliding connection between the slide and the fixed arm permitting of relative rotation of the arms, and a device for rotating the pivoted arm about its pivots to represent changes in distance from the vertex measured along the great circle.

9. A navigational instrument for great circle sailing, comprising a fixed supporting member formed with a circular bearing surface, a ring member mounted on the fixed member to turn on said bearing surface, a semi-circular arm fixed to one of said members with its plane at right angles to that of the ring member, a semi-circular arm pivoted to the other member for rotation about an axis diametral to the ring member, a sliding connection between the two arms which can be set to any desired position, representing the latitude of the vertex of the intended great circle, on the pivoted arm and, when so adjusted, is free to slide relatively to the other arm, means for effecting controlled adjustment, to represent changes in distance from the vertex of the great circle, of the pivoted arm about its pivots and means for indicating changes in angular relationship of the ring member with respect to the fixed member.

ARNOLD GRAVES.